Feb. 28, 1961  W. C. EDDY, JR  2,973,066
TORQUE RESPONSIVE CONTROL DEVICE
Filed Aug. 12, 1958  3 Sheets-Sheet 1

INVENTOR.
WILLIAM C. EDDY, JR.
BY
*M. A. Hobbs*
ATTORNEY

INVENTOR.
WILLIAM C. EDDY, JR.
BY  M. A. Hobbs
ATTORNEY

Feb. 28, 1961 W. C. EDDY, JR 2,973,066
TORQUE RESPONSIVE CONTROL DEVICE
Filed Aug. 12, 1958 3 Sheets-Sheet 3
FIG. 4
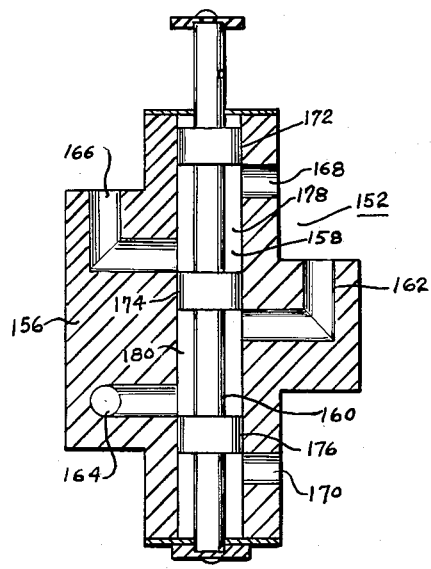
FIG. 5
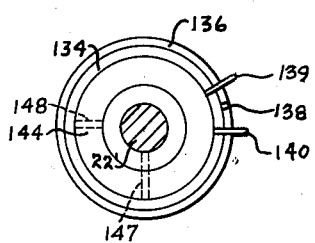
FIG. 6
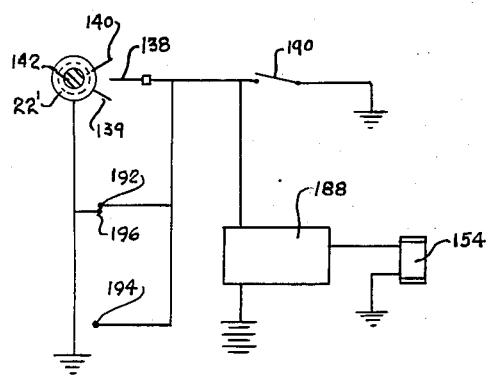
FIG. 7
INVENTOR.
WILLIAM C. EDDY, JR.
BY M. A. Hobbs
ATTORNEY

United States Patent Office 2,973,066
Patented Feb. 28, 1961

---

2,973,066

TORQUE RESPONSIVE CONTROL DEVICE

William C. Eddy, Jr., Michigan City, Ind., assignor to Television Associates, Inc., Michigan City, Ind., a corporation of Illinois Filed Aug. 12, 1958, Ser. No. 754,596

9 Claims. (Cl. 192—.02)

The present invention relates to machines utilizing torque as a cutting or feeding force, such as drill presses, tapping machines and lathes and more particularly to machines of this type having a torque responsive control.

One of the principal objects of the present invention is to provide a torque responsive control unit for drilling and tapping machines, which senses overload condition during the machining operation and responds immediately to the condition to alternately reverse the direction of rotation of the tool until the overload condition is relieved or until the machine is stopped.

Another object of the invention is to provide a torque responsive control mechanism for machine tool equipment employing a torque force for either the machining or feeding operation, which can readily be adjusted to predetermined maximum loads and which will permit the machine to operate in the same manner as if the mechanism were not installed thereon, except when load conditions on the tool approach the point where damage to the machine or cutting tool might occur.

Another object is to provide a compact, versatile torque responsive and direction reversing control unit for tapping and drilling machines and the like which can be used in combination with standard motors and conventional machine tool equipment.

Additional objects and advantages will become apparent from the following description and accompanying drawings, wherein:

Figure 4 is a cross sectional view of a valve incorporated in the present torque responsive control mechanism taken on line 4—4 of Figure 3;

Figure 5 is a cross sectional view of a portion of the control mechanism taken on line 5—5 of Figure 2;

Figure 6 is a cross sectional view of another portion of the control mechanism taken on line 6—6 of Figure 2; and Figure 7 is a diagram of a suitable circuit for controlling the operation of the present mechanism.

The present overload responsive mechanism is adaptable to a variety of operations and a number of different types of machines which employ a torque force for the cutting tool and can be incorporated in machines wherein the tool is moved and the work piece is held stationary or with machines wherein the tool is held stationary and the work piece is moved. The present control mechanism is particularly adapted to tapping and drilling operations and for the purpose of illustrating the invention will be described in connection with a tapping mechanism using a conventional electrical motor. In the type of machine illustrated herein the feed and return of the cutting tool to its initial starting position is controlled automatically by a suitable control mechanism and circuit of well known and standard design.

Figure 1:
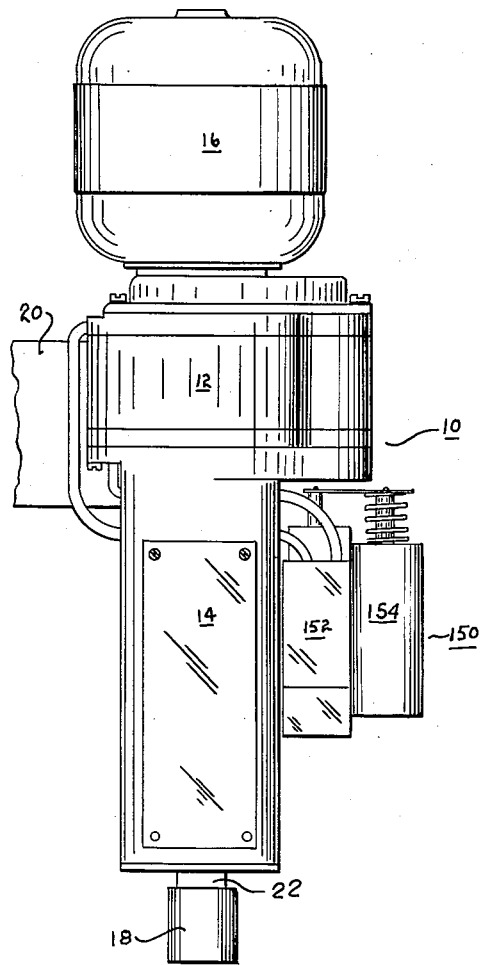
Figure 1 is an elevational view of a tapping machine embodying the present invention.

Referring more specifically to the drawings and to Figure 1 in particular, numeral 10 designates generally a tapping mechanism embodying the present invention, 12 a tool rotation reversing unit, 14 a torque sensing and control unit, 16 an electric motor for driving the tapping tool (not shown) mounted in chuck 18, and 20 a portion of a member supporting the tapping mechanism in a machine, said member being rigidly secured to the housing of the rotation reversing mechanism 12. Motor 16 and chuck 18 are standard equipment readily available on the market and will not be described in detail herein. Chuck 18 is driven by motor 16 through rotation reversing unit 12, torque sensing unit 14 and a power output shaft 22 on which the chuck is mounted. The present tapping mechanism embodies features specifically disclosed and claimed in my copending application Serial No. 666,633 filed June 19, 1957, now Patent No. 2,918,999, issued December 29, 1959.

The rotation reversing unit 12 is interposed between motor 16 and torque sensing unit 14 and is connected with the motor by a power input shaft 24 and with unit 14 by power transfer shaft 26, the latter shaft being axially aligned with shaft 24 and containing a recess 28 in the end thereof for receiving the end of shaft 24. Shafts 24 and 26 are not directly connected and under certain operating conditions rotate in opposite directions. The reversing mechanism consists of a plate 30 rigidly mounted on the lower end of shaft 24, a plate 32 rotatably mounted on the upper end of shaft 26, and an axially movable plate 34 also mounted on the upper end of shaft 26 and connected to said latter shaft for rotation therewith by a splined portion 36. Plate 34 transmits the power for driving shaft 24 and chuck 18 from plates 30 and 32 by engaging the adjacent surface of one or the other plate 30 or 32. Since plate 30 is mounted rigidly on shaft 24 which is driven directly by motor 16, this plate constantly rotates with the motor and transmits the forward rotation from the motor through shafts 26, 22′ and 22 to chuck 18 when plate 34 is in contact with plate 30.

Plate 32 is driven from the motor through shaft 24, gear 40 mounted and secured to shaft 24, idle gear 42, gear 44 mounted on a shaft 46, and gears 48, 50 and 52, the latter two gears being mounted on a shaft 54 and adapted to drive plate 32 through a gear surface 55 on the internal wall of downwardly extending flange 56. As can be seen from following this train of gears from shaft 24 to plate 32, plate 32 rotates in the opposite direction, forming the structure for reversing the direction of rotation of the chuck. A housing 60 for unit 12 forms the support for motor 16 and the bearing support for shafts 24, 26, 46 and 54 and consists of a body 62, upper and lower end plates 64 and 66 and gear covers 68 and 70, respectively. Bearings 72 and 74 for shaft 24 are mounted in cover 68 and plate 64, and bearing 75 for plate 32 is mounted in plate 66. Cover 70 is provided with a boss 76 receiving the upper end of the housing 77 of torque sensing unit 14 and containing a bearing 78 for the lower end of shaft 26. The plates and covers are held together and in contact with the body by a plurality of bolts or screws 80, 82 and 84.

Surrounding plates 30, 32 and 34 and body 62 is a cylindrical chamber 85 axially aligned with shafts 24 and 26 and completely closed with the exception of passages 86 and 88. A floating piston 90 is mounted in chamber 85 dividing the chamber into upper and lower compartments 92 and 94 and being rotatably connected to plate 34 by an internal annular flange 96 seated in a deep annular groove 98 in the side of the plate. In order that plate 34 may rotate freely with shaft 26, flange 96 is mounted on ball bearing 100 at the bottom of groove 98. Piston 90 engages the wall of chamber 85 and forms an effective seal therewith so that each compartment is essentially air tight. Since the travel of piston 90 in chamber 85 is relatively small, a diaphragm sealed at the side walls of the chamber may be used satisfactorily in place of the piston. With this arrangement, air under pressure admitted into compartment 94 through passage 88 will force piston 90 and plate 34 upwardly until the latter is in firm contact with plate 30, thus establishing direct drive from motor 16 through shaft 24, plates 30 and 34, shafts 26, 22' and 22 to chuck 18.

This direct drive remains as long as the pressure in compartment 94 is substantially greater than the pressure in compartment 92. When the air under pressure is released from compartment 94 and admitted into compartment 92, piston 90 moves downwardly, first disengaging plate 34 from plate 30, thus interrupting the direct drive, and thence engaging plate 34 with plate 32. Since plate 32 which is driven through the train of gears is rotating in the opposite direction of plate 30, the rotation of shafts 24, 22' and 22 and chuck 18 is reversed. This reverse drive is maintained as long as the pressure in compartment 92 is substantially greater than that in compartment 94. When methodical scheduling of machining requires a cessation of rotation, the pressures in the two compartments may be equalized by altering the valve design, causing piston 90 to occupy a position intermediate between plates 30 and 32 and thus assume a neutral position. This provides an interrupted cycle without stopping the drive motor.

Shaft 26 is journalled in and supported by bearings 75 and 78 and extends into compartment 108 in which the torque mechanism is located. This shaft is connected to shaft 22' which seats at its upper end in a recess 110 in the lower end of shaft 26 and at its lower end in an axial bore 112 in shaft 22, shafts 22 and 22' being keyed by slot 114 and pin or key 116 with each other so that the two shafts rotate constantly in unison. The slot and key permit axial movement downwardly of shaft 22 so that the tapping die can feed itself on to the blank being threaded without movement of the entire tapping unit. Shaft 22 is supported for both axial and rotative movements by bearing 120 rigidly mounted in the lower part of the tapper housing and by shaft 22' with an intervening snug fitting sleeve 122. After the tapping operation has been completed or interrupted, shaft 22 is returned to its initial starting position, as shown in Figure 1, by a coil spring 124 mounted on shaft 22 and reacting between the inner face of bearing 120 and an annular shoulder 126 on the upper end of said shaft. The return of shaft 22 to its original position is cushioned by spring 128.

The driving force for the tool is transmitted from unit 12 through a spring 130 mounted around shaft 22' and connected at its upper end to a collar 131 mounted on and rigidly secured to the end of shaft 26 and at its lower end to a collar 132 mounted on and rigidly secured to shaft 22' by a set screw (not shown). Spring 130 is relatively strong and retains collars 131 and 132 in a fixed position relative to one another during all normal operations of the tapper, thus causing shaft 26 and shafts 22' and 22 to rotate in unison under those conditions.

Figure 2:
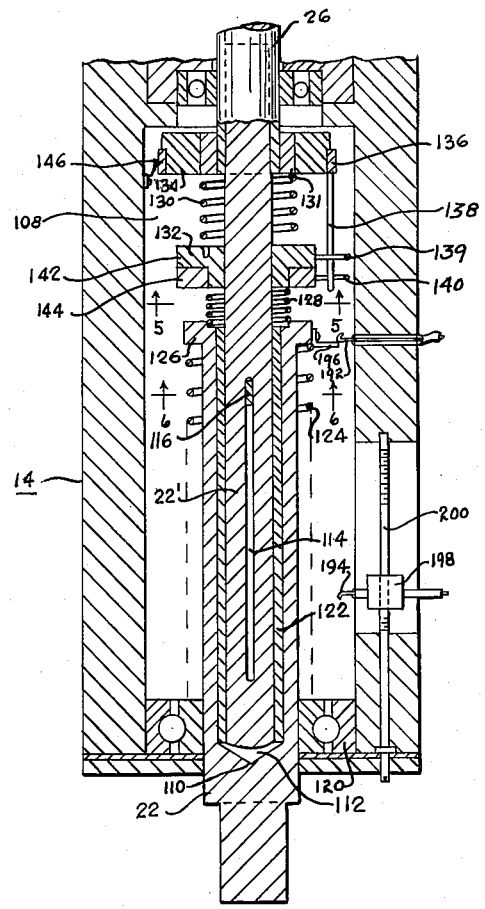
Figure 2 is an enlarged cross sectional view of the torque sensing mechanism incorporated in the machine shown in Figure 1 and forming a part of the present invention.

When overload conditions in the tapping tool are encountered, spring 130 yields and permits slight relative rotation to occur between shaft 26 and shaft 22'. This relative rotation is utilized to sense the overload condition and to transmit a signal to the rotation reversing unit. Mounted rigidly on the lower end of shaft 26 is an electrical nonconducting collar 134 with an electrical conducting ring 136 secured thereto and carrying an electrical contact element 138 projecting downwardly parallel to and spaced from shaft 22' to approximately the lower edge of metal collar 132. This element is also spaced outwardly from the collar and is adapted to contact pins 139 and 140 projecting radially from the periphery of collar 132 as seen in Figures 2 and 5, pin 139 being seated in the upper annular part 142 of the collar and pin 140 being seated in the lower annular part 144 of the collar. Pins 139 and 140 are adjustable circumferentially relative to element 138 by loosening the set screws 147 and 148 in the respective collar parts 142 and 144 and rotating each part in one or the other directions until the desired position of the respective pin is obtained and then tightening the set screw to retain the parts in their newly adjusted positions. Element 138 is connected by ring 136 and a fixed contact 146 to an electrical control circuit and pins 139 and 140 are grounded through metal collar parts 142 and 144, respectively. The strength of spring 130 and the position of pins 139 and 140 determine the degree of torque required to actuate the torque responsive control mechanism during overload condition.

The control mechanism for unit 12 is shown at numeral 150 mounted on the side of the unit housing and consists of a valve 152 and a solenoid 154 for operating the valve. The solenoid, being of conventional construction, will not be described in detail herein. The valve is shown in detail in Figure 4 and consists of a valve housing 156, cylindrical chamber 158, slidable valve element 160, inlet air passages 162 and outlet passages 164 and 166, the former outlet passage supplying air to compartment 94 for forward rotation of the tool and the latter passage to compartment 92 for reverse rotation. Chamber 158 is connected with the atmosphere by two air exhaust ports 168 and 170. Valve element 160 is generally cylindrical in shape and contains three separate lands 172, 174 and 176 with recesses 178 and 180 therebetween. When the valve element is in the position shown, i.e. in the raised position, air inlet passage 162 is connected with passage 164 supplying air to compartment 94 for driving the tool forward, and passage 166 serving as an air exhaust for compartment 92 is connected to exhaust port 168. The valve is held in this raised position by spring 182 mounted on the end of the solenoid plunger 184 and connected to the valve by lever 186 and stem 187. When the solenoid is energized in response to actuation of the torque sensing mechanism 14, valve element 160 is moved downwardly until land 172 is disposed between passage 166 and port 168, and land 174 is disposed between passages 162 and 164, and land 176 is positioned below port 170. With the valve element in this position, air flows to compartment 92 through passages 162 and 166, and from compartment 94 through passage 164 and port 170, thus driving the chuck in the reverse direction. When the solenoid is deenergized, spring 182 returns the valve element to the position shown in Figure 3, driving the tool in the forward direction.

A suitable circuit for controlling the operation of the present mechanism is shown in Figure 7 wherein the various elements are illustrated schematically and identified by the numerals used on the preceding figures. A latching relay 188 included in the circuit is a conventional component and alternately energizes and deenergizes the solenoid when the circuit therefor is interrupted by closing contacts 138 and 139 or 138 and 140, or manual switch 190. Contacts 192 and 194 mounted in the housing beside shaft 22 for determining the limit of travel of the tool are preferably included to provide automatic operation of the unit. The circuit with these two contacts is completed by a contact 196 attached to shoulder 126 on shaft 22 which travels between the two contacts during the advance and withdraw strokes of the operating cycle. Contact 194 is mounted on a tap 198 threaded onto a screw 200 so that the maximum limit of travel of the tapping tool may be varied for different operations.

Figure 3:
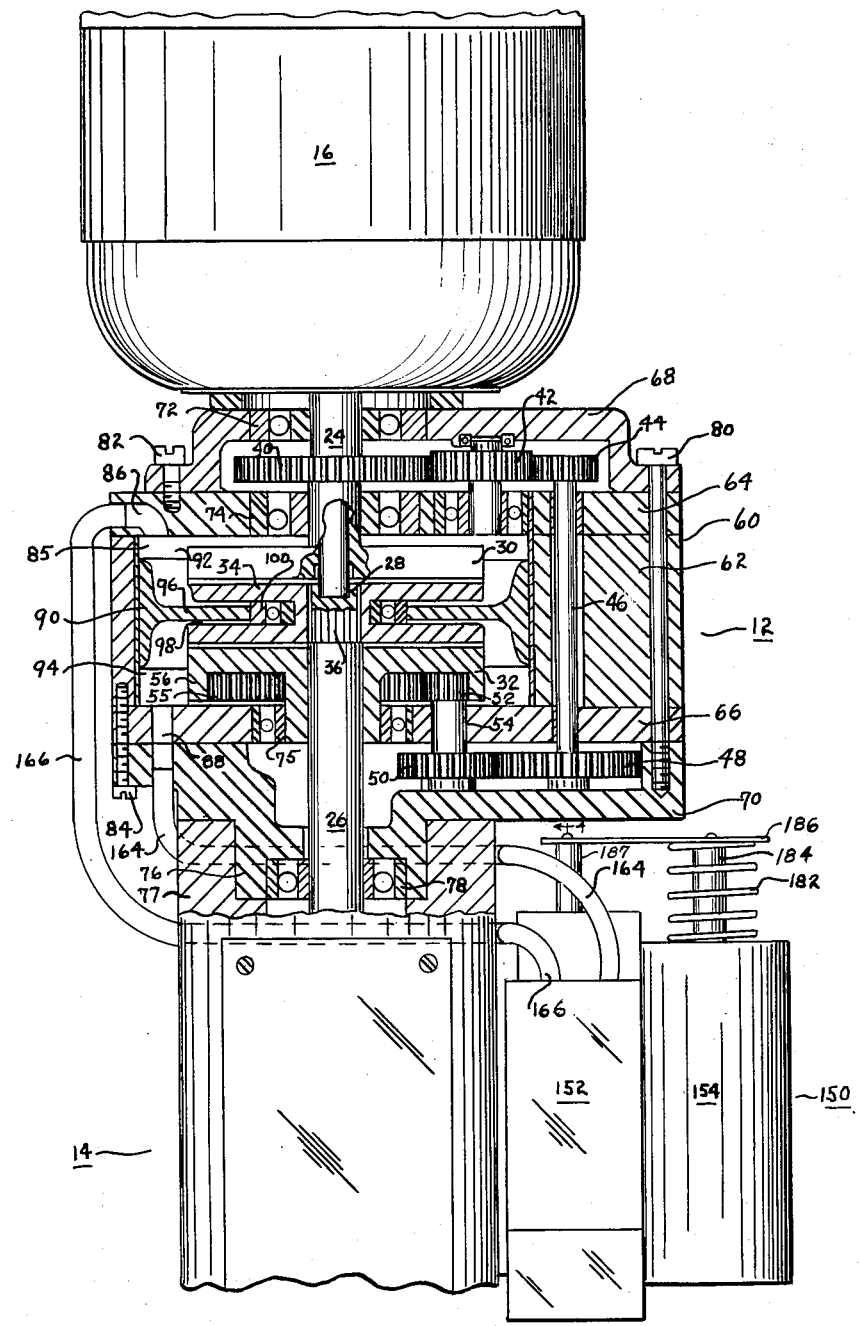
Figure 3 is an enlarged cross sectional view of the direction reversing control mechanism of my machine, shown in partial elevation, a motor and the housing enclosing the torque sensing mechanism.

In the operation of the present tapping machine, starting with valve 152 in the position shown in Figures 3 and 4, air under pressure is admitted through passage 162, conduit 164 and passage 88 into compartment 94 forcing piston 90 upwardly and clutch plate 34 against the lower surface of plate 30. With these two plates in contact with each other, power is transmitted from motor 16 through shafts 24, 26, 22' and 22 for driving the tool in the forward direction. As the tapping operation proceeds, the tool being self-fed into the work piece pulls shaft 22 longitudinally downwardly on shaft 22' with key 116 sliding in slot 114 continuing to transmit the torque from shaft 22' to shaft 22 and then to the tool. In the event the tool becomes choked or otherwise binds in the work piece, the torque on shafts 22 and 26 immediately increases and when a predetermined limit is reached, as determined by the strength of spring 130, shaft 26 rotates relative to shaft 22' sufficiently to permit element 138 to contact pin 139 thereby closing the circuits to a standard latching relay 188 which has across its contacts solenoid 154. When solenoid 154 is energized, piston 156 of valve 152 is moved from the position shown in Figure 4 to the position where recess 178 is connecting air inlet passage 162 with conduit 166 and recess 180 is connecting conduit 164 with exhaust port 170, thus supplying air through passage 86 into compartment 92, forcing piston 90 downwardly and clutch plate 34 into engagement with plate 32. Since plate 32 is rotating in the opposite direction from plate 30, the direction of rotation of plate 34, shafts 26, 22' and 22 and the tapping tool is reversed. The unit continues to operate in the reverse direction until manually controlled by switch 190 or automatically by closing of contacts 192 and 196 or by the closing of contacts 138 and 140, said latter contacts being held in spaced position by spring 130 until an overload condition develops while the motor is operating in the reverse direction. When this condition occurs the force of spring 130 is overcome and shaft 26 rotates relative to shaft 22', causing contact 138 to engage contact 140, thus deenergizing the solenoid to relieve the pressure in compartment 92 and admit air again into compartment 94 for forward rotation of the tool. As the tapping operation reaches completion, contact 196 touches contact 194, energizing solenoid 154 which shifts valve 152 to admit air into compartment 92, thereby reversing the direction of rotation of the tapping tool. The reverse rotation continues until manually interrupted or until contact 196 engages contact 192.

Only one embodiment of the present invention has been disclosed herein; however, various changes and modifications may be made without departing from the scope of the present invention.

I claim:

1. A rotary tool drive mechanism with an overload mechanism therein, comprising an electrical motor, a power input shaft connected to said motor, a power output shaft, a tool holding device mounted on one end of said last mentioned shaft, a power transfer shaft interposed axially between said power input and power output shafts, a clutch plate rigidly mounted on the end of said input shaft adjacent said transfer shaft, a clutch plate rotatably mounted on said transfer shaft and spaced from the end thereof, an axially movable clutch plate mounted on the end of said transfer shaft between said first two mentioned plates and connected to said transfer shaft for rotation therewith, a shaft spaced from and parallel with said shafts, gears connecting said input shaft with said last mentioned shaft, gears connecting said second mentioned plate with said last mentioned shaft for rotation in the direction opposite said input shaft, a body having a cylindrical chamber around said third mentioned plate and in axial alignment with said transfer shaft, a piston dividing said chamber into two compartments and being connected to said third mentioned plate for relative rotation and axial movement therewith, means defining a passage connecting said compartments with a source of air under pressure, a valve means in said passage for controlling the flow of air therethrough, an electrical means for operating said valve means, an electrical circuit for controlling said electrical means, a collar mounted around and rigidly connected to said transfer shaft, a pair of collars mounted around said power output shaft and being rotatively adjustable on said shaft and to each other, a calibrated spring mounted around said output shaft, one end being connected to said first mentioned collar and the other end to one of the collars of said pair, an electrical contact element on the periphery of each collar of said pair, and an electrical contact element secured to said first mentioned collar and adapted to contact said first mentioned contacts when predetermined torque is reached for closing said circuit.

2. A rotary tool drive mechanism with an overload mechanism therein, comprising a power input shaft, a motor connected to said shaft, a power output shaft, a tool holding device mounted on one end of said last mentioned shaft, a power transfer shaft interposed axially between said power input and power output shafts, a clutch plate rigidly mounted on the end of said input shaft adjacent said transfer shaft, a clutch plate rotatably mounted on said transfer shaft and spaced from the end thereof, an axially movable clutch plate mounted on the end of said transfer shaft between said first two mentioned plates and connected to said transfer shaft for rotation therewith, power transmission means connecting said input shaft with said second mentioned plate for driving said plate in the direction opposite said input shaft, a body having a cylindrical chamber around said third mentioned plate, a piston dividing said chamber into two compartments and being connected to said third mentioned plate for relative rotation therewith, means defining a passage connecting said compartments with a source of air under pressure, a valve means in said passage for controlling the flow of air therethrough, an electrical means for operating said valve means, an electrical circuit for controlling said electrical means, a collar mounted around and rigidly connected to said transfer shaft, a collar mounted around and rigidly connected to said output shaft, a spring mounted around one of said shafts, one end being connected to said first mentioned collar and the other end to said second mentioned collar, and contacts on said second mentioned collar for completing an electrical circuit when a predetermined torque is applied to said spring.

3. A rotary tool drive mechanism with an overload mechanism therein, comprising a power input shaft, a motor connected to said shaft, a power output shaft, a tool holding device mounted on one end of said last mentioned shaft, a power transfer shaft interposed longitudinally between said power input and power output shafts, a clutch plate rigidly mounted on the end of said input shaft adjacent said transfer shaft, a clutch plate rotatably mounted on said transfer shaft and spaced from the end thereof, an axially movable clutch plate mounted on the end of said transfer shaft between said first two mentioned plates and connected to said transfer shaft for rotation therewith, a shaft spaced from and parallel with said shafts, gears connecting said input shaft with said last mentioned shaft, gears connecting said second mentioned plate with said last mentioned shaft for rotation in the direction opposite said input shaft, a body having a cylindrical chamber around said third mentioned plate and in axial alignment with said transfer shaft, a piston dividing said chamber into two compartments and being connected to said third mentioned plate for relative rotation and axial movement therewith, means defining a passage connecting said compartments with a source of air under pressure, a valve means in said passage for controlling the flow of air therethrough, an electrical means for operating said valve means, and an electrical circuit for controlling said electrical means including electrical switch means interposed between said transfer and output shafts and means responsive to a predetermined torque on said output shaft for controlling said switch means for closing said circuit.

4. A rotary tool drive mechanism with an overload mechanism therein, comprising a power input shaft, a motor connected to said shaft, a power output shaft, a tool holding device mounted on one end of said last mentioned shaft, a power transfer shaft interposed longitudinally between said power input and power output shafts, a clutch plate rigidly mounted on the end of said input shaft adjacent said transfer shaft, a clutch plate rotatably mounted on said transfer shaft, an axially movable clutch plate mounted on the end of said transfer shaft between said first two mentioned plates and connected to said transfer shaft for rotation therewith, power transmission means connecting said input shaft with said second mentioned plate for driving said plate in the direction opposite said input shaft, a body having a cylindrical chamber around said third mentioned plate, a piston dividing said chamber into two compartments and being connected to said third mentioned plate for relative rotation therewith, means defining a passage connecting said compartments with a source of air under pressure, a valve means in said passage for controlling the flow of air therethrough, an electrical means for operating said valve means, and an electrical circuit for controlling said electrical means including electrical switch means interposed between said transfer and output shafts and means responsive to a predetermined torque on said output shaft for actuating said switch means for controlling said circuit.

5. A rotary tool drive mechanism with an overload mechanism therein, comprising a power input shaft, a motor connected to said shaft, a power output shaft, a tool holding device mounted on one end of said last mentioned shaft, a power transfer shaft interposed between said power input and power output shafts, a clutch plate rigidly mounted on the end of said input shaft adjacent said transfer shaft, a clutch plate rotatably mounted on said transfer shaft, an axially movable clutch plate mounted on said transfer shaft between said first two mentioned plates and connected to said transfer shaft for rotation therewith, power transmission means connecting said input shaft with said second mentioned plate for driving said plate in the direction opposite said input shaft, a body having a chamber around said third mentioned plate, a movable wall dividing said chamber into two compartments and being connected to said third mentioned plate, means defining a passage connecting said compartments with a source of air under pressure, a valve means in said passage for controlling the flow of air therethrough, an electrical means for operating said valve means, and an electrical circuit for controlling said electrical means including a switch means interposed between said transfer and output shafts and means responsive to a predetermined torque on said output shaft for controlling said switch means for closing said circuit.

6. A device with a torque sensing mechanism therein, comprising a power input shaft, a power output shaft, a power transfer shaft interposed between said power input and power output shafts, a clutch plate rigidly mounted on the end of said input shaft adjacent said transfer shaft, a clutch plate rotatably mounted on said transfer shaft, an axially movable clutch plate mounted on said transfer shaft between said first two mentioned plates and connected to said transfer shaft for rotation therewith, power transmission means connecting said input shaft with said second mentioned plate for driving said plate in the direction opposite said input shaft, a body having a chamber around said third mentioned plate, a piston dividing said chamber into two compartments and being connected to said third mentioned plate for relative rotation therewith, means defining a passage connecting said compartments with a source of air under pressure, a valve means in said passage for controlling the flow of air therethrough, an electrical means for operating said valve means, and an electrical circuit for controlling said electrical means including switch means interposed between said transfer and output shafts and means responsive to a predetermined torque on said output shaft for actuating said electrical means for controlling said electrical means through said circuit.

7. A rotation reversing mechanism, comprising a input shaft, a power output shaft, a power transfer shaft interposed between said power input and power output shafts, a clutch plate rigidly mounted on the end of said input shaft adjacent said transfer shaft, a clutch plate rotatably mounted on said transfer shaft, an axially movable clutch plate mounted on said transfer shaft between said first two mentioned plates and connected to said transfer shaft for rotation therewith, power transmission means connecting said input shaft with said second mentioned plate for driving said plate in the direction opposite said input shaft, a body having a chamber around said third mentioned plate, a movable wall dividing said chamber into two compartments and being connected to said third mentioned plate for relative rotation therewith, means defining a passage connecting said compartments with a source of air under pressure, a valve means in said passage for controlling the flow of air therethrough, and an electrical means for operating said valve means.

8. A rotation reversing mechanism, comprising a power input shaft, a power output shaft, a clutch plate rigidly mounted on said input shaft, a clutch plate rotatably mounted on said output shaft, an axially movable clutch plate mounted on the end of said last mentioned shaft between said first two mentioned plates and connected to said last mentioned shaft for rotation therewith, a shaft spaced from and parallel with said shafts, gears connecting said input shaft with said last mentioned shaft, gears connecting said second mentioned plate with said last mentioned shaft for rotation in the direction opposite said input shaft, a body having a chamber around said third mentioned plate, a piston dividing said chamber into two compartments and being connected to said third mentioned plate for relative rotation therewith, means defining a passage connecting said compartments with a source of air under pressure, and a valve means in said passage for controlling the flow of air therethrough.

9. A device with a torque sensing mechanism therein, comprising a power input shaft, a power output shaft, a clutch plate rigidly mounted on said input shaft, a clutch plate rotatably mounted on said output shaft, an axially movably clutch plate mounted between said first two mentioned plates, power transmission means connecting said input shaft with said second mentioned plate for driving said plate in the direction opposite said input shaft, a body having a chamber around said third mentioned plate, a movable wall dividing said chamber into two compartments and being connected to said third mentioned plate for relative rotation therewith, means defining a passage connecting said compartments with a source of air under pressure, and a valve means in said passage for controlling the flow of air therethrough.

References Cited in the file of this patent
UNITED STATES PATENTS

| | | |
|---|---|---|
| 2,753,729 | Main | July 10, 1956 |
| 2,861,460 | Lips et al. | Nov. 25, 1958 |